United States Patent [19]

Deming

[11] 3,754,189

[45] Aug. 21, 1973

[54] RECEIVER DECODER

[75] Inventor: Andrew F. Deming, Alliance, Ohio

[73] Assignee: The Alliance Manufacturing Company, Inc., Alliance, Ohio

[22] Filed: Dec. 2, 1971

[21] Appl. No.: 204,141

[52] U.S. Cl. ................ 325/392, 325/37, 343/171 R

[51] Int. Cl. ............................................ H03d 1/32

[58] Field of Search ................ 325/37, 55, 64, 392, 325/466; 343/225; 340/171

[56] References Cited

UNITED STATES PATENTS

| | | | |
|---|---|---|---|
| 3,138,755 | 6/1964 | Kompelien | 325/64 X |
| 3,513,399 | 5/1970 | Wycoff | 325/55 |
| 3,522,536 | 8/1970 | Reynolds | 325/37 |

*Primary Examiner*—Benedict V. Safourek

*Attorney*—George V. Woodling, Louis V. Granger et al.

[57] ABSTRACT

A receiver decoder is disclosed with the receiver having a first carrier frequency modulated by a second frequency and also having present a third frequency lower than the carrier frequency. The receiver is operable as a normal receiver on just the carrier and modulation frequencies, or with the decoder plugged into the receiver the combination also is operable with a third frequency. With the decoder connected in the receiver, a received signal containing the proper first, second and third frequencies must be received before a signal is provided to the output of the receiver. The decoder supplies a bias disabling the receiver until a signal is received containing the proper first and third frequencies, whereupon the disabling bias is terminated for a time period. If during this time period a signal is received containing the proper first and second frequencies, then an output is provided to the main load.

34 Claims, 4 Drawing Figures

INVENTOR.
ANDREW F. DEMING
BY Woodling, Krost, Granger and Rust
ATTORNEYS.

INVENTOR.
ANDREW F. DEMING
BY Woodling, Krost, Granger and Rust
ATTORNEYS.

RECEIVER DECODER

BACKGROUND OF THE INVENTION

The disclosed receiver may be used with a remote control system, for example, a remotely controled garage door opener. In such service the received signal may come from a small battery-powered low output transmitter complying with federal communication regulations as to radiated power. As an example, the carrier may be in the VHF range and the modulation in the audio or super-audio frequency range.

For remote control, the signal emitted by the transmitter is intended to correspond to one and only one receiver. This is for security purposes so that, with an attached garage, for example, unauthorized persons cannot gain entrance to the garage and hence, to the house. Spurious responses caused by atmospheric disturbances and man-made signals sometimes have provided a signal to which the prior art receivers will respond. For example, if there are ten different carrier frequencies and ten different modulation frequencies, then this provides a total of 100 different codes which are possible for a particular transmitter and receiver combination. It is well known that lightning contains many different frequencies, and if man-made signals happen to be present at the same time that lightning is present, this combination could provide a spurious response to which the receiver would pass a signal to its output.

Also, other door operator transmitters in the neighborhood might send out a signal on the same carrier and modulation frequencies or at least one of these, and this together with the static or natural disturbances might trigger the receiver into an output and hence open the garage door.

A serviceman has an extremely difficult time to locate the cause of spurious responses because the receiver is usually on 24 hours a day on a standby basis, awaiting the reception of a proper signal. The peculiar circumstances which cause a spurious signal to trigger the receiver will normally not occur when a serviceman is present and thus he seldom can find the cause. This is different from a complete breakdown of the equipment where he can use a signal generator or other serviceman's equipment to locate the break or short in the circuit and have it repaired.

With the increased use of attached garages to homes and the increased use by burglars of sophisticated electronic equipment to produce a signal to open such garage doors, the security of keeping the door closed against unauthorized entry becomes quite severe.

It has previously been suggested to provide a third frequency with the transmitter first transmitting a carrier modulated by a second frequency and then after a time period the second frequency ceases and a third modulation frequency is transmitted. The receiver has to be constructed to first respond to a carrier and the second modulation frequency, which closes a first relay with time delay of dropout, for example, and then if immediately thereafter the carrier with the third modulation frequency is present this closes a second relay and produces a signal which is passed to the receiver output. This is an expensive system and one which requires a considerable time for the transmitter signal to be transmitted because the receiver must respond first to the second frequency and then to the third frequency. Still further the transmitter must be provided initially with the capability of transmitting the second frequency and then the third frequency in sequence and the receiver must also be initially provided with the capability of receiving the second frequency and then the third frequency in sequence. This makes the initial cost of the radio equipment quite high and increases the difficulties of tuning the transmitter and the receiver to each other.

Another disadvantage with this prior art system is the increased number of transmitters and receivers which must be manufactured and which must be stocked by a distributor. If there are ten different first carrier frequencies and ten different second modulation frequencies plus ten different third modulation frequencies, this is ten times ten times ten or 1,000 different receivers which must be manufactured and also 1,000 different receivers which must be stocked by the manufacturer and the distributor. This is sufficiently burdensome that it becomes increasingly difficult to find a distributor who is willing to stock all of these receivers.

Accordingly, an object of the invention is to provide a receiver which obviates the above-mentioned disadvantages.

Another object of the invention is to provide a receiver subcoder such that the receiver is simultaneously receptive to three different frequencies.

Another object of the invention is to provide a receiver system wherein the security of a remotely controled receiver is materially increased.

Another object of the invention is to provide a receiver decoder wherein the decoder does not detune the receiver circuit to its sensitivity to a second modulating frequency.

Another object of the invention is to provide a receiver decoder wherein reception of a third frequency terminates a bias which normally has been keeping the receiver disabled.

Another object of the invention is to provide a receiver decoder wherein the presence of a third frequency is detected on a conductor and the receiver is disabled by a voltage condition on that same conductor.

Another object of the invention is to provide a receiver decoder which may be plugged into an existing test point jack on an existing receiver which normally is used with only a first carrier and a second modulation frequency.

Another object of the invention is to provide a receiver decoder which has minimum electrical connections to a main receiver.

Another object of the invention is to provide a receiver decoder which obtains a signal on a conductor of a test plug and normally disables the receiver by an electrical condition on that same conductor and then may enable the receiver for a time period by a changed electrical condition on that same conductor.

Another object of the invention is to provide a receiver decoder which permits a customer to purchase a simplified receiver receptive to only first and second frequencies and later to add a decoder with a third frequency response, if more security is desired or if spurious operating signals are encountered.

SUMMARY OF THE INVENTION

The invention may be incorporated in a receiver operable from a signal having a first frequency carrier modulated at a second frequency and also containing a third frequency lower than said carrier, said receiver comprising in combination, first means responsive to said first frequency, a main load, second means responsive to said second frequency and connected to supply an output to said main load in the presence of a received signal containing said first and second frequencies, disabling means connected to one of said responsive means and operative in the absence of a received signal containing said third frequency to disable output to said main load, and third means responsive to said third frequency and having an output connected to terminate said disabling means output and enable said receiver for at least a time period to thus pass current to said main load upon the presence of a received signal containing said first and third frequencies and subsequently said first and second frequencies.

Other objects and a fuller understanding of the invention may be had by referring to the following description and claims, taken in conjunction with the accompanying drawing.

DESCRIPTION OF THE PREFERRED EMBODIMENT

Figure 1:
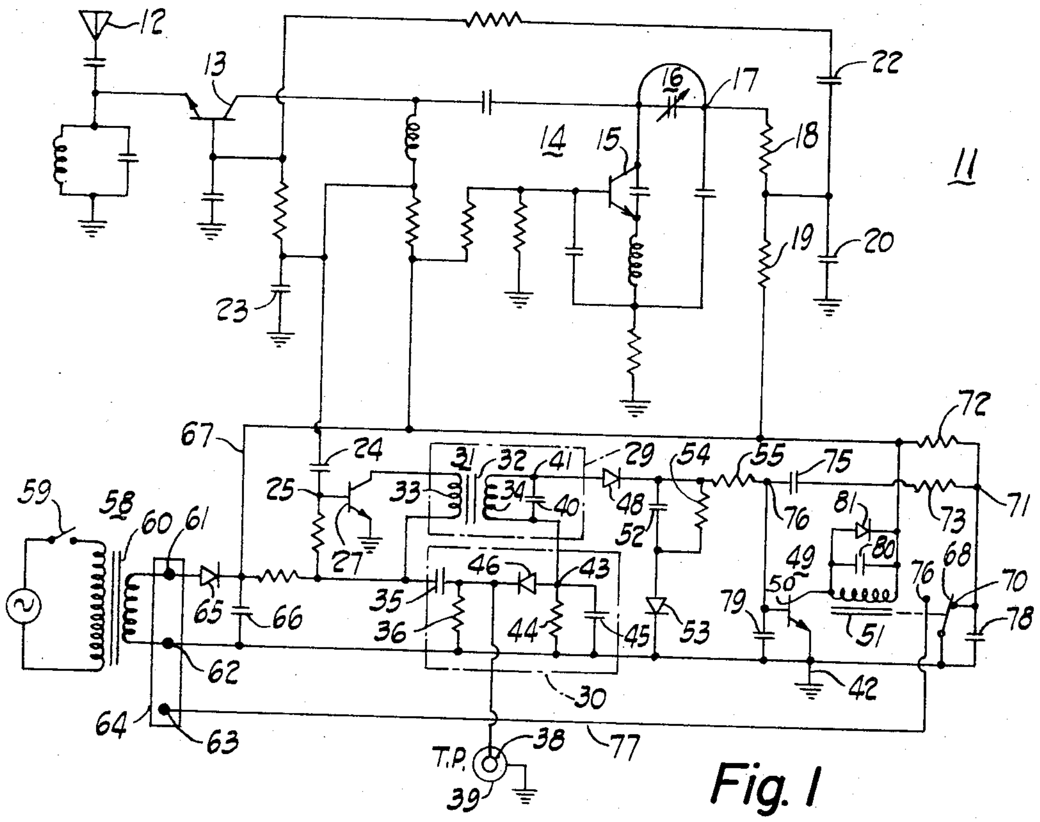
FIG. 1 is a schematic diagram of a main receiver responsive to first and second frequencies.

FIG. 1 illustrates a preferred embodiment of the invention incorporated in a radio receiver system 11. The radio receiver may be used for the remote control of a physical system, for example, a garage door operator. The radio receiver 11 is adapted to be operative on a received signal of a predetermined first frequency carrier modulated by a lower second modulation frequency, and also subject to receiving random noise signals. The receiver 11 includes a receiving antenna 12 supplying an input to a transistor 13 which is an isolation stage. The signal is then passed to a superregenerative circuit 14 which includes a transistor 15 and a parallel resonant output circuit 16. This parallel resonant output circuit 16 is tuned to a predetermined first frequency carrier, which for example, might be in the order of 250 MHz. The output of the superregenerative circuit 14 appears at a terminal 17 and contains the carrier frequency, the modulation frequency and also a squelch frequency intermediate these two frequencies. In this example, the modulation second frequency may be an audio or super-audio frequency.

The squelch frequency depends upon the constants of the circuit 14 and may be 600 KHz., for example. This output is applied to resistors 18 and 19 in series and to a capacitor 20 which presents a low impedance to ground for the squelch frequency and accordingly the modulation frequency signal is passed by a capacitor 22 to the transistor 13 in a reflex circuit for amplification of such modulation frequency signal. This amplified output appears across a capacitor 23 and it is passed by a coupling capacitor 24 to an input terminal 25 of a lower frequency amplifier 27. The amplifier 27 is shown as a transistor supplying an output to a detector circuit which includes a tuned load 29 and an untuned load 30.

The parallel resonant circuit 16 is tuned to resonance to the first or carrier frequency and hence is a first means responsive to this first frequency. The tuned load 29 is tuned to resonance at the second or modulation frequency and hence is a second means responsive to this second frequency. The tuned load 29 includes a transformer 31 with a movable slug core 32 and the transformer has a primary and a secondary winding 33 and 34, respectively with the primary winding connected to the output of the transistor 27. The output from the transistor 27 is through the primary winding 33, a capacitor 35 and a resistor 36 to ground. Each of the output signals of the transistor 27 appear across the resistor 36, and accordingly, a center conductor 38 of a test point jack is connected to this junction of the capacitor 35 and resistor 36. The outer conductor 39 of this test point jack is connected to ground. With all of the audio signals including the random noise appearing across resistor 36, this may be considered the input to the untuned load 30 and it is stated as being untuned to distinguish it from the tuned load 29.

In this tuned load 29 a capacitor 40 is connected across the secondary winding 34 to tune it to resonance which is reflected into the primary winding 33. The upper terminal of capacitor 40 is a first terminal 41 relative to ground 42 which may be considered a second terminal. The lower end of capacitor 40 is connected to a junction 43 at the untuned load 30 and passes from there through a resistor 44 to ground. A capacitor 45 is connected in parallel with resistor 44 and a diode 46 is connected with a polarity to conduct current from junction 43 to the test point center conductor 38.

A unidirectional conducting device shown as a diode 48 is connected to the first terminal 41 to pass current to a main load 49. This main load includes a transistor 50, a relay 51 and a time delay capacitor 52. A diode 53 connects the capacitor 52 between diode 48 and ground 42. A discharge resistor 54 is connected across the capacitor 52. When the time delay capacitor has been sufficiently charged positive, then current is passed through a resistor 55 to the base of transistor 50. This occurs when the voltage of the capacitor 52 exceeds the forward voltage drop from base to emitter of the transistor 50.

A power supply 58 is provided such that when a switch 59 is closed, a step-down transformer 60 is energized and the secondary thereof energizes first and second terminals 61 and 62 of a terminal strip 64 which also has a third terminal 63. The AC voltage between terminals 61 and 62 is supplied through a rectifier 65 to a filter capacitor 66 so that a supply conductor 67 is positive relative to ground 42. The relay 51 is connected to this DC supply conductor 67. The relay controls single pole double-throw contacts with a contact blade 68 connected to ground 42. The normally closed contacts 70 are connected to a terminal 71 at the junction of first and second bleeder resistors 72 and 73. A capacitor 75 is connected in series with resistor 73 between terminal 71 and a terminal 76, which is connected to the base of transistor 50. The normally open contacts 76 are connected by a lead 77 to the third terminal 63 on the terminal strip 64. This provides an external connection controled by the energized or deenergized condition of the load 49. Protective capacitors 78 and 79 are connected between terminal 71 and ground and terminal 76 and ground and a filter capacitor 80 is connected across the relay 51. A protective diode 81 is also connected across this relay 51.

OPERATION

The radio receiver 11 conveniently may be used in a remote control of a physical device, for example, the remote control of a garage door operator from a lower powered transmitter. Current practice in the industry is to use small hand-sized transmitters which are transistorized and powered by a small dry cell battery and have a low radiated power output in the order of one microwatt maximum. This low power output coupled with the high frequency currently used, namely, in the range of 250 to 350 MHz., has caused erratic operation among devices of this type in the past. As the user approaches the garage in driving his automobile, he presses a button on the transmitter to place it in operation. The transmitter emits a signal which is a selected one of a plurality of carrier first frequencies and one of a plurality of second modulation frequencies. As will be later explained, it may also contain a third lower frequency, however, the main receiver as described so far in FIG. 1 is usable with just a singly modulated carrier frequency. The tuned circuit 16 is responsive to the first frequency and if the received signal on the antenna 12 is one having a carrier at this frequency, then the signal is passed to the lower frequency amplifier 27. Normally noise being received on the antenna 12 is passed and is further amplified by the amplifier 27. The untuned load 30 is that which is more responsive to this noise and off-frequency signals than the tuned load 29, for example, there may be four times as much voltage across resistor 36 as across the primary winding 33 due to this noise. The polarity of the diode 46 is such that junction 43 will be negative as caused by the audio frequency noise on this resistor 36. In a practical circuit this may be one to three volts negative at junction 43 relative to ground 42. The conduction by diode 46 makes the test jack conductor 38 positive by a small amount due to this rectification of the audio frequency noise.

When a received signal of the proper first and second frequencies is received, then it is passed by the superregenerative circuit 14 and the tuned load 29 resonates at this second frequency. This means a high voltage appears across the secondary winding 34 and hence across the primary winding 33. Diode 48 is poled to conduct when the first terminal 41 is positive. However, it will be noted that diodes 46 and 48 are in effect poled in opposite directions. This means that the outputs of the tuned and untuned loads 29 and 30 are effectively connected in opposition. The output of the untuned load 30 appears across terminal 43 and 42 and is negative on terminal 43 relative to ground terminal 42. The output of the tuned load 29 is positive on the first terminal 41 relative to the ground 42. Accordingly, under normal stand-by conditions, the output from the noise from the untuned load 30 predominates and no current is passed to the main load 49. When the proper second frequency signal is received however, then the output from the tuned load 29 at terminal 41 predominates and exceeds the negative voltage at terminal 43. Under this condition the output of the tuned load 29 is more positive than a given value to pass current to the main load 49. The given value in this case is a voltage, for example, 2/10ths of a volt to cause the diode 48 to conduct. Upon conduction the time delay capacitor 52 will be charged. At the threshold of received signal, diode 48 conducts only on the crests of the positive half cycles but as the received signals grow stronger, the diode 48 may conduct for practically the entire positive half cycles. Resistor 54 is connected to continually discharge capacitor 52 but at some point the charge on capacitor 52 will reach a voltage value exceeding the forward bias on transistor 50. This may be 7/10ths of a volt, for example, for silicon transistors and hence transistor 50 will conduct to energize relay 51. When this happens the normally closed contact 70 is opened and the normally open contact 76 is closed. This places an output signal on the third terminal 63, which may be used for any desired purpose, for example, in a garage door operator this may be used to control a power relay energizing a motor which drives the garage door. The operation of this particular part of the circuit is more fully described in my previous U.S. Pat. No. 3,579,240.

Figure 2:
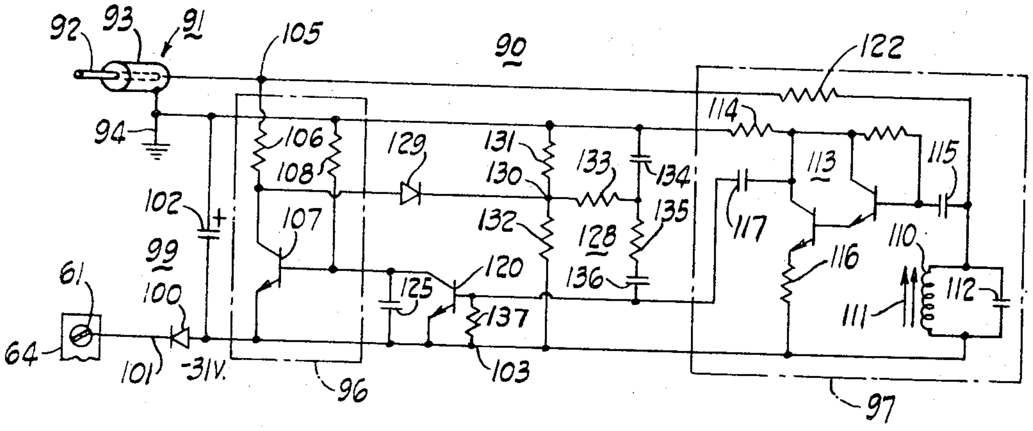
FIG. 2 is a schematic diagram of a receiver decoder which may be connected to the receiver of FIG. 1 and which adds a third frequency capability; and, FIG. 3 is a schematic diagram of an alternative receiver decoder which may be electrically connected to the main receiver of FIG. 1; and, FIG. 4 is a graph of voltages obtainable in the circuit.

FIG. 2 shows a preferred embodiment of a decoder 90 having a test plug 91 which may be plugged into the test jack 38–39 of the main receiver 11 to add a third frequency capability thereto. The decoder 90 may be made on a printed circuit board and may be physically small and lightweight to support itself physically when plugged into the test point jack 38–39. Electrical connections are also made at the same time of this physical support. The test plug 91 includes a center conductor 92 connecting to the center conductor 38 and an outer conductor 93 connecting to the outer conductor 39 of the test jack. The outer conductor 93 is connected to an internal ground 94 of the decoder 90.

The decoder 90 includes generally a disabling means 96 and a third frequency responsive means 97. The disabling means 96 may also be considered a bias means to bias the main receiver 11 so that no current is passed to the main load 49. The third frequency responsive means 97 may also be considered a tuned circuit resonant to the third frequency, which is lower than the carrier frequency. The decoder 90 includes a power supply means 99 including a rectifier 100 poled to conduct current through a flexible lead 101 to the first terminal 61 on the terminal strip 64. This flexible lead 101 may readily be connected on the terminal 61 when the decoder is plugged into the test jack. The power supply 99 also includes a filter capacitor 102 connected between the voltage supply conductor 103 and ground 94. This polarity of the rectifier 100 makes supply conductor 103 negative relative to ground 94, for example, minus 31 volts. The ground 94 of decoder 90 is connected to the ground 42 of the main receiver and with the first terminal 61 connection, this provides an operating voltage to the decoder 90 and also provides a reference potential; namely, ground.

The test plug center conductor 92 is connected to a terminal 105 and the disabling means 96 is connected between this terminal and the supply conductor 103. This disabling means 96 includes generally a voltage dropping resistor 106 and a transistor 107. A bias resistor 108 is connected between ground 94 and the base of transistor 107 and since ground is positive of the supply conductor 103 in this decoder 90, this biases the transistor 107 normally into conduction. The circuit may be traced considering FIG. 2 in conjunction with FIG. 1. Starting with ground 94 or 42, which is positive, the current flows upwardly through resistor 44, the diode 46, the test point center conductor 38, test plug center conductor 92 down through resistor 106 and transistor 107 to the negative supply conductor 103. This current flow makes the upper end of resistor 44 at junction 43 negative with respect to ground. In a practical circuit constructed in accordance with this invention, this was made to be about 20 volts negative relative to ground. This is sufficient negative bias voltage supplied by the biasing or disabling circuit 96 such that the main receiver is diabled. By this is meant that no current may be passed to the main load 49. The superregenerative circuit 14 is a sensitive circuit with a gain in the order of one million, yet, irrespective of the strength of the signal on the antenna 12, for example, even if the proper first and second frequencies are present thre will not be sufficient positive voltage at terminal 41 relative to ground 42 such that the output of the tuned load 29 can overcome this negative voltage output of the untuned load 30 plus the bias from the decoder 90. This is why the circuit is described as being disabled by the negative bias supply from the decoder 90.

The decoder 90 also includes the third frequency responsive means 97 which in this preferred embodiment is a tuned circuit resonant to this third frequency. The tuned circuit includes an inductance 110 with a tunable core 111. A capacitor 112 is connected in parallel with the inductance 110 for parallel resonance. This circuit is tuned to resonance at a third frequency which is lower than the first or carrier frequency and in this preferred embodiment is also lower than the second or modulation frequency. For example, in one practical circuit this might be in the range of 500 to 5,000 Hz. Upon parallel resonance the voltage across this inductance 110 rises and this establishes turn-off of the transistor 107 to terminate the negative bias on the junction 43 and thus enable the receiver 11. Since the receiver is at that time enabled, this means that if the signal is received containing the proper first and second frequencies, then current is passed to the main load 49 at that time.

The third frequency responsive means 97 includes in this preferred embodiment a buffer amplifier 113 shown as a Darlington transistor pair. Power is supplied to this amplifier through a resistor 114 from the positive operating voltage which in this case is ground 94. The input base of the Darlington pair is connected by a coupling capacitor 115 to the upper end of the tank circuit 110–112. The emitter output of the Darlington pair is fed through a resistor 116 to the negative operating voltage at conductor 103. The AC output of the Darlington pair is supplied through a coupling capacitor 117 to the input base of a driver transistor 120. A high impedance isolating resistor 122 connects the input terminal 105 to the upper end of the tank circuit 110-112 to have supplied thereto the low frequency signals present on the test jack center conductor 38. An accelerator circuit 128 is provided in the subcoder 90. This accelerator circuit includes a diode 129 connected from the lower end of resistor 106 to a junction 130 between voltage divider resistors 131 and 132 connected between ground and the negative supply conductor 103. A resistor 133 and a capacitor 134 are connected in series between junction 130 and ground. A resistor 135 and capacitor 136 are connected in series between the junction of resistor 133 and capacitor 134 and the base of the transistor 120. A resistor 137 is connected from the base of transistor 120 to conductor 103.

OPERATION

When a signal is received, correct in the first frequency, this is passed by the superregenerative circuit 14 and the tuned circuit 16 thereof to the lower frequency amplifier 27. During normal operation the voltage across resistor 36 is approximately four times as great as the voltage across the secondary 34. This is because the noise and off-frequency signals generate a much larger output from the untuned load 30 than from the tuned load 29. However, during those periods when the correct second frequency is applied to the amplifier 27, then the parallel resonance of the detector circuit 29 assures that up to about 90 percent of the total output of the detector appears across the secondary winding 34 and only about 10 percent across the resistor 36. Also present across resistor 36, in this example, will be the aforementioned proper third frequency. This third frequency is applied to the decoder 90.

During the initial period that the decoder 90 is powered, there will be a small leakage current through the high resistance 108 to charge the large capacitor 125 so that the base of transistor 107 is positive relative to conductor 103, and transistor 107 is made conducting. Now, when the proper third frequency is passed along the center conductor 92 of test plug 91, it will be passed to the third frequency responsive means 97. The voltage across the parallel resonant circuit 110–112 thus increases considerably and the AC signals at this third frequency are passed by the coupling capacitor 115 to the Darlington transistor pair 113. This transistor pair has an output at the collector of the last transistor which is passed through the AC coupling capacitor 117 to drive the base of the transistor 120 at this third frequency rate. The Darlington transistor pair 113 has a high impedance input to not load the inductance 110 and has a low impedance output to drive the transistor 120. The turn-on of the transistor 120 on half wave positive pulses at the third frequency rate, rapidly discharges the capacitor 125, perhaps in about 10 miliseconds.

Figure 4:
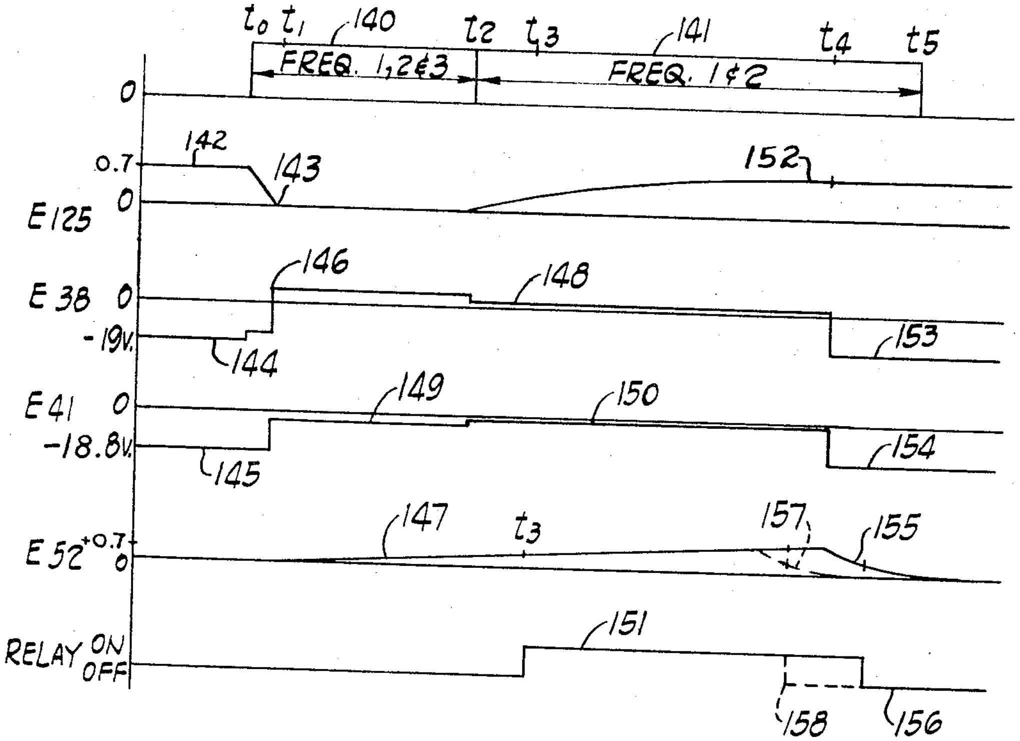

FIG. 4 shows a graph of voltages available at different parts of the receiver circuit 11. A curve 140 illustrates the signal received at the antenna 12 which as an example includes the proper first, second and third frequencies between a time $t_0$ and a time $t_2$. Also a curve 141 shows the time period of a received signal containing only the proper first and second frequencies, the third frequency being missing. Prior to this time $t_0$, the voltage across the capacitor 125 is shown by a curve 142 and this shows a voltage of 0.7 volts positive with respect to conductor 103 across this capacitor 125. From time $t_0$ to time $t_1$; namely, about 10 miliseconds, the capacitor 125 discharges to have essentially zero voltage thereacross at time $t_1$ as shown at a point 143 on this curve 142. Prior to this the transistor 107 was conducting and this caused a large DC negative bias voltage to appear on the center conductor test point 38. In the aforementioned circuit this might be a −19 volt DC bias established on the curve 144 showing the voltage at this conductor 38. During this same period prior to time $t_0$ this large negative voltage at this conductor 38 causes conduction of the diode 46 so that junction 43 and first terminal 41 is at a minus voltage, for example, −18.8 volts as shown by curve 145 of the potential at this terminal 41. Now at time $t_1$ when the transistor 107 has stopped conducting, the potential at test point 38 goes up to about +5 volts as shown at a point 146. The reason for this positive voltage is that the third frequency signal is now an off frequency signal as far as the tuned load 29 is concerned. Accordingly, a large proportion of the total output of transistor 27 appears across the resistor 36. This will be positive at the center conductor 38. This positive voltage partially biases off diode 46 so that the potential at the first terminal 41 remains at about −4.8 volts.

The curves of FIG. 4 assume a condition wherein small hand-sized transmitters may be far away from the receiver and hence be emitting a relatively weak signal, not much more than the threshold of sensitivity of the receiver. This might be five microvolts of signal at the antenna 12, for example. During this condition the very crests of the positive half cycles at the second frequency rate are resonated by the tuned circuit 34–40 sufficiently so that these crests are passed by the diode 48. These charge the capacitor 52 relatively slowly and this capacitor is being continuously discharged by the paralleled resistor 54. Under these conditions the charging of capacitor 52 may be sufficiently slowly achieved, as shown by a curve 147, so that the plus 0.7 volt charge condition on this capacitor 52 is not reached until a time $t_3$ which is subsequent to time $t_2$. The time $t_2$ is that at which the third frequency disappears from the received signal. When the third frequency disappears, the noise, in this case an off frequency signal, on resistor 36 decreases to a lower level, perhaps +2 volts as shown at a portion 148 of the curve of voltage on this center conductor 38. During this same time period from time $t_1$ to time $t_2$, the voltage at terminal 41 is about four to five volts negative because of conduction of diode 46 on the negative half cycles of voltage on the resistor 36. This is shown by a portion 149 on the curve of the potential at terminal 41. This negative voltage at terminal 41 makes it difficult for the proper second frequency to be passed by the diode 48 during positive half cycles.

Now at the time $t_2$ when the third frequency has disappeared from the incoming received signals, this third frequency, which is noise insofar as the tuned circuit 29 is concerned, has now disappeared and hence the negative bias at terminal 41 has about disappeared as shown by a portion 150 of the curve of potential at this terminal 41. This means that the positive half cycles of the second frequency will be more readily passed by diode 48 to more quickly charge capacitor 52 and hence the relay will be energized at a time $t_3$ by conduction of transistor 50. This relay energization is shown by a curve 151 as occurring at the time $t_3$. It will be understood that with a stronger signal containing frequencies one, two and three, then the energization and pull-in of the relay 51 may occur prior in time to the time $t_2$; namely, prior to the time when the third frequency disappears from the incoming signal.

At the time $t_2$ when the third frequency has ceased, the decoder 90 will be conditioned so that the third frequency voltage across the tank circuit 110–112 disappears. This causes transistor 120 to cease conduction and hence the capacitor 125 starts to charge as shown by portion 152 of the curve of voltage across this capacitor. This charge is relatively slow because of the high resistance of resistor 108. At some point in time $t_4$, not necessarily related to the time $t_5$ when frequencies one and two cease, the capacitor 125 will charge to about 0.7 volts positive on the upper plate thereof so that transistor 107 again starts to conduct. This establishes the aforementioned large negative bias on center conductor 38 and on the terminal 41 as shown by portions 153 and 154 of the voltage curves on these terminals, respectively. This disables the receiver 11 so that no further signals may be passed to the relay 51. The capacitor 52 is now being discharged rather rapidly by resistor 54 as shown by curve portion 155 and when the potential thereacross falls below 0.7 volts, the transistor 50 ceases conduction and relay 51 drops out as shown by curve portion 156. The above description is with the frequencies one and two ceasing at a time $t_5$ which is subsequent to the time $t_4$. However, should the frequencies one and two cease prior to the time $t_4$, then capacitor 52 ceases charging and starts to discharge along a line 157. This would cause dropout of the relay at a point 158 on the relay energization curve.

The accelerator circuit 128 makes certain that once transistor 107 starts to turn off, it actually does turn off and quickly. Resistors 131 and 132 form a voltage divider, and the potential of junction 130 may be half way between ground and conductor 103, for example, at a potential of −15.5 V. At some time during turning off of transistor 107, the collector thereof will rise in potential to a point exceeding −15.3 volts, at which time diode 129 will conduct. This supplies a momentary current through resistors 133 and 135 and capacitor 136 to help drive the base of transistor 120 more positive and hence assure turn on thereof.

Figure 3:
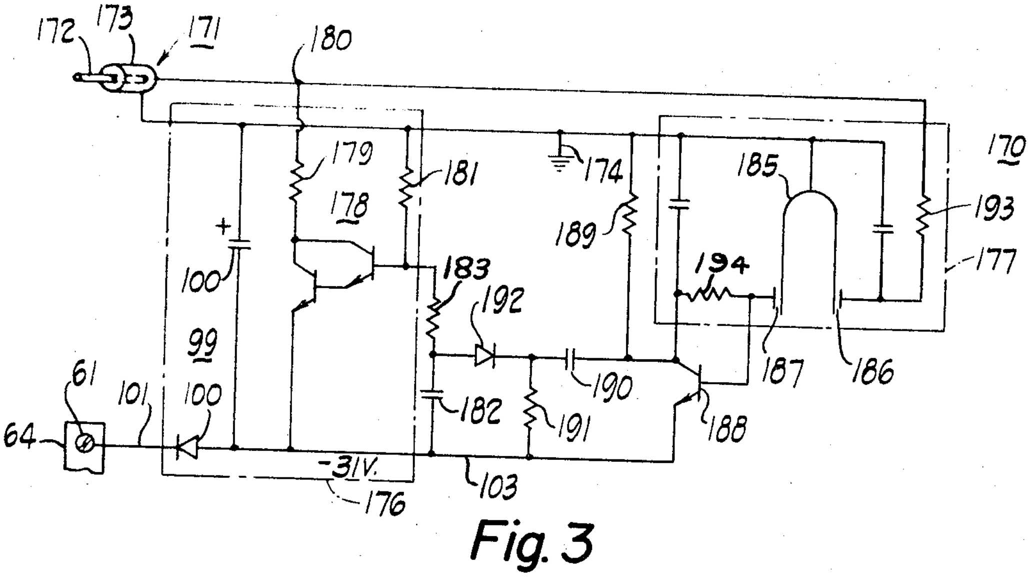

FIG. 3 shows an alternative decoder circuit 170 which may be used in place of the decoder 90 and which has a test plug 171 with a center conductor 172 and an outer conductor 173. This test plug 171 may be plugged into the test point jack 38–39 of the receiver 11. The decoder 170 has the same power supply 99 to establish a negative voltage, for example, −31 volts on a negative power supply conductor 103. This is again established by a flexible conductor 101 which may be connected to the terminal strip terminal 61. The power supply 99 establishes this negative voltage on conductor 103 relative to a ground 174 to which the outer conductor 173 of test plug 171 is connected. The decoder 170 includes generally a disabling means 176 and a third frequency responsive means 177. The disabling means 176 is quite similar to the disabling means 96 of the circuit of FIG. 2. This disabling means 176 includes a Darlington transistor pair 178 connected in series with a resistor 179 between the negative supply conductor 103 and a terminal 180 which is connected to the test plug center conductor 172. Normally, this transistor pair 178 is biased into conduction by the bias resistor 181. This bias resistor is a large value impedance and through a resistor 183 charges a capacitor 182 connected in series therewith between negative supply conductor 103 and the ground connection 174. Accordingly, normally during non-receipt of third frequencies, the capacitor 182 will be charged enough to bias transistor pair 178 into saturation.

The third frequency responsive means 177 is a means tuned to be responsive to this frequency and is shown in this embodiment as a tuning fork 185. This tuning fork may vibrate or be in resonance at the selected third frequency rate which again may be in the order of 300 to 5,000 Hz. The input to the tuning fork 185 is from the terminal 180 through a high resistance 193 and a coupling capacitor 186 and upon receiving the proper third frequency this forces the tuning fork 185 into vibration at its resonant frequency. The output from the tuning fork is from the other fork leg at a coupling capacitor 187 which drives the base of the transistor 188 at this third frequency rate. This transistor 188 is normally biased partly on by current through resistors 189 and 194. Transistor 188 amplifies the third frequency voltage and the output appears across the resistor 189. The third frequency rate is passed by a capacitor 190 to a resistor 191. During the negative excursions of the upper end of resistor 191, a diode 192 will conduct, again at this third frequency rate. This rapidly drives the upper plate of capacitor 182 more negative so that the transistor pair 178 ceases conduction. This stops the bias previously developed by conduction of this Darlington transistor pair. Accordingly, with the bias stopped, this enables the receiver 11 so that if the received signal on antenna 12 contains a proper first and second frequencies, then the diode 48 passes this second frequency output to energize the relay 51. This is essentially the same operation as the circuit of FIG. 2 and as described by the aid of the curves of FIG. 4. Again when the third frequency ceases, the tuning fork 185 will cease oscillation, the transistor 188 will cease amplifying, diode 192 will cease conduction and capacitor 182 will again be permitted to charge slowly through the large value resistor 181. When about 1.4 volts forward bias appears across capacitor 182, this will again establish forward conduction of the transistor pair 178 to again start the negative bias which disables the receiver 11.

The decoder 90 or 170 is responsive to the third frequency which may be received on the antenna 12 of the receiver 11. The decoder by itself has a terminal 105 or 180 which may be considered a first terminal, ground 94 or 174 may be considered a second terminal and input terminal 61 may be considered a third terminal of this decoder. The bias means or disabling means 96 or 176 develops a bias voltage and the transistor 107 or 178 is a switch means connected to this bias means to selectively connect and disconnect the bias voltage from the first terminal 105 or 180. The frequency responsive means 97 or 177 is responsive to a given frequency input; namely, the third frequency, on the first terminal 105 or 180. In each decoder there is a means connecting the output of the frequency responsive means to the switch means to actuate this switch means to change the bias voltage condition on the first terminal upon the incoming pressence of the given or third frequency. This connecting means includes the transistor 120 in FIG. 2 and the transistor 188 and diode 192 in FIG. 3. In the preferred embodiment of FIG. 2, this change of the bias voltage condition on the first terminal is a disconnection of the bias voltage from this first terminal. In both FIGS. 2 and 3 there is a power supply means with a rectifier and filter so that the bias voltage is a DC voltage. The DC bias voltage appears between the first and second terminals 105 and 94 and the second and third terminals 94 and 61 are adapted to have an AC voltage applied thereto. The capacitor 125 or 182 provides a time delay of reapplying the bias voltage to terminal 105 or 180 upon cessation of third frequency input to said first terminal 105 or 180.

The aforementioned receiver circuit 11 and decoders 90 or 170 establish a circuit which accomplishes many objectives. The decoder 90 or 170 easily may be plugged into an existing test point jack 38 on any one of several existing receivers. Prior to the plug in of this decoder, the receiver is completely operative on two frequencies; namely, the first carrier frequency and the second or modulation frequency. The test point jack is a valid test point so that a serviceman in the field may readily check for proper carrier frequency and proper modulation frequency. It is recognized that many servicemen in the field will not have complete laboratory test equipment, and in fact, may have only a small DC voltmeter. Accordingly, the test point 38 has been selected with this in mind. To test the proper operation of the receiver 11 in the field, the serviceman merely connects a DC voltmeter from the test point center conductor 38 to ground 39 or 42. First, the modulation frequency is tuned considerably away from the proper point by moving the adjustable core slug 32. Next, the variable capacitor in the tank circuit 16 is adjusted to get a maximum reading on the voltmeter. This will be because the super-regenerative circuit 14 is passing a maximum of audio frequency signals, primarily noise, when the receiver carrier tuned circuit 16 is correctly tuned to the carrier of the transmitted signal. Second, the modulation frequency is adjusted by the movable core slug 32 until the voltmeter gives a minimum reading. The reason why the voltmeter gives a minimum reading at the proper modulation frequency is that the proportion of output voltage from the tuned load 29 relative to the untuned load 30 is a maximum at the second or modulation frequency. Since the test point center conductor 38 is effectively measuring the voltage output of the untuned load 30, this is then a minimum at the time that the second frequency received signal is a maximum. Accordingly, it will be seen that the decoder 90 or 170 plugs into an existing test point jack which is a valid and operable test point for determining the proper condition of operation of the receiver 11.

This plug-in to the test point jack establishes that the decoder 90 or 170 is operable with a minimum of electrical connections to the receiver. The plug-in establishes two electrical connections and additionally provides physical support for the small lightweight decoder. A third electrical connection by means of the flexible conductor 101 is easily made to the terminal strip 64 by merely a screwdriver to fasten the conductor lug to this terminal 61. These minimum electrical connections provide not only an operating voltage to the decoder but also provide a reference potential in this case ground 42 or 94.

The above description illustrates that the decoder 90 or 170 has three different electrical conditions all on the same test point center conductor 38: (1) the third frequency signal is supplied to the decoder 90 or 170; (2) the entire receiver 11 is disabled by a bias voltage applied on this center conductor; and, (3) the entire receiver 11 is enabled by a changed electrical condition on this semiconductor 38.

The fact that the decoder 90 or 170 is easily plugged in or disconnected from the receiver 11 permits the security of a system to be materially increased without requiring large numbers or transmitters and receivers to be manufactured and stocked. For example, if there were ten different first carrier frequencies ten different second modulation frequencies and ten different third frequencies, then this could mean 1,000 different receivers required to be manufactured and stocked if the prior art system were followed. The prior art system was one wherein the entire receiver had to be constructed and wired together to operate as a complete system utilizing these three frequencies. Not only would the manufacturer need to stock these 1,000 different receivers, but also distributors would need to stock such receivers and to locate such distributors willing to stock this number of receivers was becoming increasingly difficult. The present invention permits the same amount of security; namely, first, second and third frequencies yet with manufacturing only ten times ten or 100 different receivers and ten decoders and stocking only 100 receivers and ten decoders by the manufacturer and by the distributor. This is about ten times fewer receivers which need to be manufactured and stocked; hence, is a very definite improvement.

The present invention is also greatly advantageous to the user. It enables the user to select one simplified system at a lower cost and later if the location of this remote control receiver is in an area wherein spurious electrical disturbances are encountered and the garage door goes up and down undesirably and due to spurious electrical disturbances, then the user may merely purchase an easily added decoder 90 or 170 to convert his receiver into one responsive to three frequencies rather than to only two frequencies.

Another important objective of the present invention is that it does not change the effective band width of the receiver in order to add the third frequency. One reason for this is that the third frequency remains on the incoming signal for only a short time, for example, a tenth of a second from time $t_0$ to $t_2$ as shown in FIG. 4. As described above when the third frequency is present, this acts generally as noise on the untuned load 30 to increase the signal thereof. This is shown at the portion 149 of the voltage at the first terminal 41 on FIG. 4. This is an establishment of a negative bias which means that the output from the tuned load 29 must be in excess of this bias in order to have current passed to the time delay capacitor 52. However, the existence of this proper third frequency is received in the decoder which then terminates the bias; namely, the disabling means, and hence the receiver is enabled after time $t_2$ without any change in band width reception characteristics of the entire receiver 11.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A receiver operable from a signal having a first frequency carrier modulated at a second frequency and also containing a third frequency at a frequency lower than said carrier frequency,
said receiver comprising in combination,
first means responsive to said first frequency,
a main load,
second means responsive to said second frequency connected to receive an input from said first responsive means and connected to supply an output to said main load in the presence of a received signal containing said first and second frequencies,
disabling means connected to one of said responsive means and operative in the absence of a received signal containing said third frequency to disable output to said main load,
and third means responsive to said third frequency and having an output connected to terminate said disabling means output for at least a time period to enable output to said main load upon the presence of a received signal containing said second frequency in addition to said first and third frequencies.

2. A receiver as set forth in claim 1, wherein said first responsive means is means tuned to resonance at said first frequency.

3. A receiver as set forth in claim 1, wherein said second responsive means includes means tuned to resonance at said second frequency.

4. A receiver as set forth in claim 1, wherein said third responsive means is means tuned to resonance at said third frequency.

5. A receiver as set forth in claim 1, wherein said disabling means includes means establishing a DC bias voltage of a given value.

6. A receiver as set forth in claim 1, including means responsive primarily to noise and off-frequency signals developing a voltage connected in opposition to the output of said second responsive means.

7. A receiver as set forth in claim 6, wherein said main load includes semi-conductor means having a forward conducting threshold value,
and means connecting the outputs of said noise responsive means and said second responsive means in opposition to apply to said semi-conductor means a voltage less than said threshold value in the absence of a received signal containing said second and third signals.

8. A receiver operable from a signal having a first frequency carrier modulated at a second frequency and also containing a third frequency at a frequency lower than said carrier frequency,
said receiver comprising in combination,
a detector circuit having first and second terminals,
means connected to pass to said detector circuit signals lower than said first frequency,
a main load,
means connected to pass current from one of said terminals to said main load upon the voltage from said first to said second terminal becoming more positive than a given value,
first means in said detector circuit responsive to said second frequency therein and having an output connected to said terminals which output from said first to said second terminal is more positive than said given value in the presence of a received signal containing said second frequency,
bias means in said detector circuit having an output connected to said terminals which bias output from said first to said second terminal is more negative than said given value in the absence of a received signal containing said third frequency,
and second means in said detector circuit responsive to said third frequency therein and having an output connected to terminate said bias means output for at least a time period to enable said detector circuit by establishing the voltage from said first to said second terminal more positive than said given value to thus pass current to said main load upon the presence of a received signal containing said second frequency in addition to said first and third frequencies.

9. A receiver as set forth in claim 8, wherein said first responsive means includes a circuit tuned to resonance at said second frequency.

10. A receiver as set forth in claim 8, wherein said second responsive means includes means tuned to resonance at said third frequency.

11. A receiver as set forth in claim 8, wherein said receiver is a remote control receiver operable from a signal of a transmitter transmitting a first frequency carrier modulated at said second frequency and interrupted at said third frequency which is lower than said second frequency.

12. A receiver as set forth in claim 8, wherein said main load includes a relay, a transistor connected to energize and relay and a diode poled said conduct current from said first terminal through input electrodes of said transistor to said second terminal upon the voltage between said first and second terminals exceeding said given value which is determined by the forward voltage drops of said diode and said transistor input electrodes.

13. A receiver as set forth in claim 8, wherein said second responsive means includes removable connections to said first and second terminals of said detector circuit to permit the receiver to be operable with the second responsive means removed and operable on a signal having said first frequency carrier modulated at said second frequency.

14. A receiver as set forth in claim 8, including a test point jack connected to said first and second terminals, and a test plug connected to the input of said second responsive means and removably connectable with said test point jack.

15. A receiver as set forth in claim 8, wherein said bias means includes a transistor, power supply means connecting said transistor to conduct current from said second to said first terminal, and said second responsive means including means to terminate conduction of said transistor to terminate said bias means output.

16. A receiver as set forth in claim 8, including means to establish said third frequency on said first terminal and also said bias output of said bias means on said first terminal.

17. A receiver as set forth in claim 8, including means in said detector circuit responsive primarily to noise and off-frequency signals and having an output connected to said terminals which output from said first to said second terminal is more negative than said given value in the absence of a received signal containing said second frequency.

18. A receiver as set forth in claim 17, wherein said first responsive means output is connected in opposition to the output of said noise responsive means.

19. A receiver as set forth in claim 8, wherein said third frequency responsive means includes a parallel resonant circuit.

20. A receiver as set forth in claim 8, wherein said third frequency responsive means includes a tuning fork.

21. A receiver decoder, comprising, in combination, a first terminal, bias means to develop a bias voltage, switch means connected to said bias means to selectively connect and disconnect said bias voltage from said first terminal, frequency responsive means having an output and having an input connected to be responsive to a given frequency input on said first terminal, and means connecting the output of said frequency responsive means to said switch means to actuate said switch means and change the bias voltage condition on said first terminal upon the presence of said given frequency.

22. A receiver decoder as set forth in claim 21, including power supply means, and means connecting said bias means to said power supply means to develop said bias voltage.

23. A receiver decoder as set forth in cliam 21, wherein said bias voltage is a DC voltage.

24. A receiver decoder as set forth in claim 21, including a second terminal, and means connecting said frequency responsive means input to said first and second terminals to be responsive to a given frequency signal therebetween.

25. A receiver decoder as set forth in claim 21, including a second terminal, and means connecting said switch means to said bias means to selectively connect and disconnect said bias voltage between said first and second terminals.

26. A receiver decoder as set forth in claim 21, including second and third terminals adapted to have an AC voltage applied thereacross, and power supply means including a rectifier connected to said second and third terminals to develop a DC bias voltage.

27. A receiver decoder as set forth in claim 21, wherein said means connecting the output of said frequency responsive means actuates said switch means to disconnect said bias voltage from said first terminal upon the presence of said given frequency.

28. A receiver decoder as set forth in claim 21, wherein said switch means includes a transistor biased into a conducting condition for the switch closed condition and biased into a non-conducting condition for the switch open condition.

29. A receiver decoder as set forth in claim 21, including second and third terminals adapted to have an AC voltage applied thereacross, and means connecting said bias means to said second and third terminals to develop a bias voltage between said first and second terminals.

30. A receiver decoder as set forth in claim 29, including power supply means, said power supply means including rectifier and filter means connected to said second and third terminals to develop a DC bias voltage between said first and second terminals.

31. A receiver decoder as set forth in claim 21, including timing means, and means to activate said timing means for a time delay of applying said bias voltage to said first terminal upon cessation of said given frequency input on said first terminal.

32. A receiver decoder as set forth in claim 21, including a time delay capacitor, means to charge said capacitor for a time delay of applying said bias voltage to said first terminal.

33. A receiver decoder as set forth in claim 21, wherein said frequency responsive means includes a parallel resonant circuit.

34. A receiver decoder as set forth in claim 21, wherein said frequency responsive means includes a mechanically vibratable tuning fork.

* * * * *